United States Patent [19]

Hawley

[11] 4,384,987

[45] May 24, 1983

[54] SUPPORTED CHROMIUM OXIDE POLYMERIZATION CATALYST

[75] Inventor: Gil R. Hawley, Bartlesville, Okla.

[73] Assignee: Phillips Petroleum Company, Bartlesville, Okla.

[21] Appl. No.: 288,840

[22] Filed: Jul. 31, 1981

[51] Int. Cl.³ .................... B01J 21/06; B01J 23/26; B01J 23/34
[52] U.S. Cl. .................. 252/458; 252/452; 252/471
[58] Field of Search ............. 252/458, 467, 471, 452; 526/105, 106

[56] References Cited

U.S. PATENT DOCUMENTS

| | | | |
|---|---|---|---|
| 2,025,140 | 12/1935 | Wenzel | 252/471 X |
| 2,843,552 | 7/1958 | Lechthaler et al. | 252/467 X |
| 2,980,659 | 4/1961 | Witt | 260/88.2 |
| 3,057,915 | 10/1962 | Riemenschneider et al. | 252/471 X |
| 3,166,537 | 1/1965 | Gregg et al. | 252/471 X |
| 3,182,048 | 5/1965 | Mills | 252/467 X |
| 3,887,494 | 6/1975 | Dietz | 252/452 |
| 3,970,613 | 7/1976 | Goldie et al. | 526/104 |
| 4,151,122 | 4/1979 | McDaniel et al. | 252/458 |
| 4,182,815 | 1/1980 | McDaniel et al. | 526/96 |
| 4,256,545 | 3/1981 | Deborski | 252/471 X |

*Primary Examiner*—Carl F. Dees

[57] ABSTRACT

A polymerization catalyst is prepared by a process which includes the step of treating silica-supported chromium oxide with a permanganate compound such as potassium permanganate. The catalyst is then activated such as by sequential heating in a reducing atmosphere and an oxidizing atmosphere. The catalyst can be used in particle-form polymerization to produce ethylene polymers having lowered shear response for a given melt index.

18 Claims, 1 Drawing Figure

SUPPORTED CHROMIUM OXIDE POLYMERIZATION CATALYST

BACKGROUND OF THE INVENTION

This invention relates to improved supported chromium oxide polymerization catalysts and to methods for preparing and using them.

It is known that olefin polymers having excellent physical and chemical properties can be prepared using supported chromium oxide catalysts. Polymerization can be carried out in hydrocarbon solution or in a slurry process, the latter in which polymer is produced in the form of small particles of solid material suspended in a diluent. The simplicity of the slurry process makes it preferable in many instances. In such polymerization processes, the melt index of the polymer can be controlled by varying polymerization temperature—higher reaction temperatures generally increase melt index. However, this expedient is limited in slurry polymerization to about 110° C. in a diluent such as isobutane, as a higher temperature causes the polymer to go into solution and results in fouling of the reactor from polymer deposition.

Other techniques are known in the art to modify the catalyst so as to produce a higher melt flow polymer. These techniques can also lower the shear response and narrow the molecular weight distribution of the polymer, but not to the extent desired for certain applications such as high speed extrusion or injection molding.

It is therefore an object of this invention to provide a supported chromium oxide polymerization catalyst.

It is a further object to provide a chromium oxide polymerization catalyst having lowered shear response for a given melt index.

It is a further object to provide a slurry polymerization process in which a polymer having excellent physical and chemical properties can be provided.

SUMMARY OF THE INVENTION

According to the invention, a polymerization catalyst comprising supported chromium oxide is prepared by a process which includes the step of treating the catalyst with a permanganate compound such as potassium permanganate. The catalyst can be treated with the permanganate prior to activation by, for example, sequential reduction and reoxidation at an elevated temperature. The catalyst can include a silica-titania support. The catalyst can be used in a particle-form polymerization process to produce ethylene polymers having excellent physical and chemical properties.

BRIEF DESCRIPTION OF THE DRAWING

The FIGURE is a plot of shear response as a function of melt index for polymers prepared using the invention catalyst as compared with control catalysts. The curve joins points representing values obtained using the invention catalyst.

DETAILED DESCRIPTION OF THE INVENTION

Figure 1:
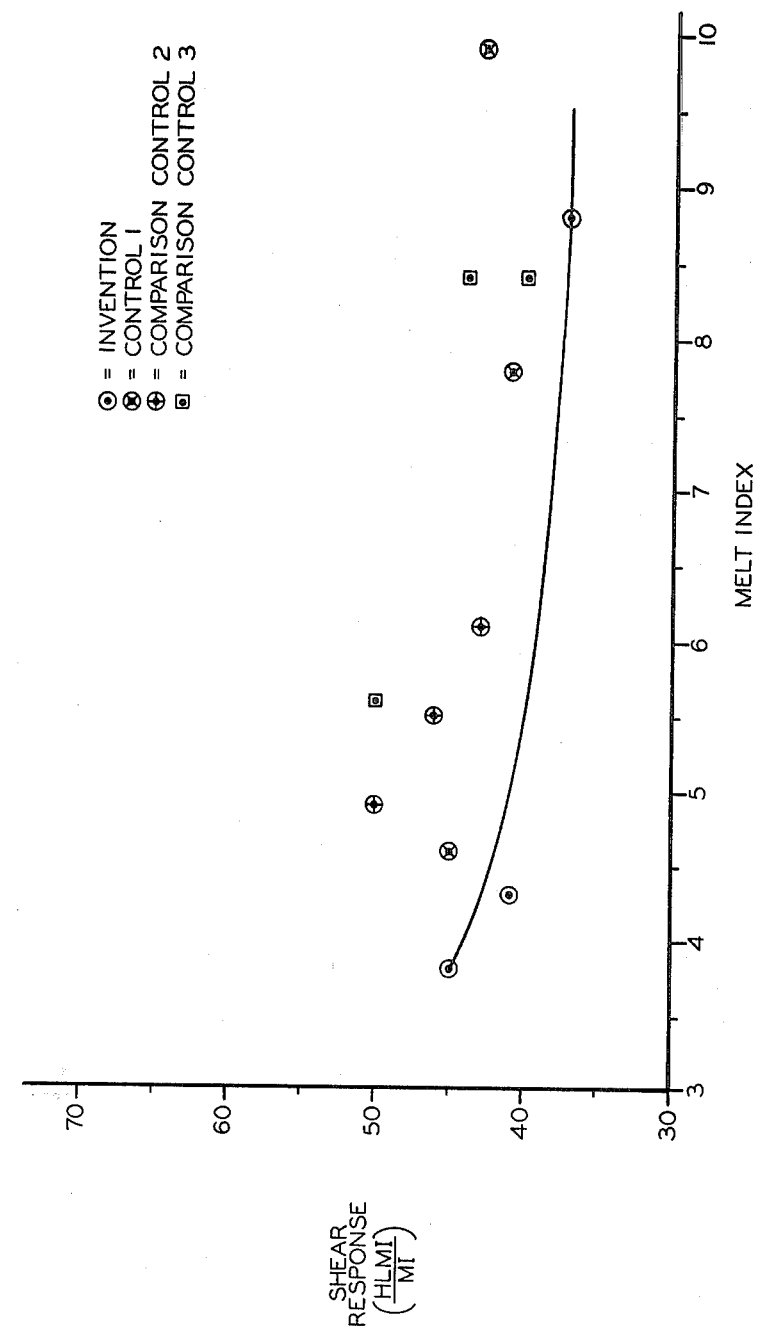

In the invention method of preparing a polymerization catalyst, supported chromium oxide is treated with a permanganate compound. Suitable permanganates for treating the supported chromium oxide include ammonium and metal permanganates of Groups IA, IB, IIA and III of the periodic table as shown in the Chemical Rubber Company Handbook of Chemistry and Physics, 54th ed., p. B-3. Specific examples of such permanganates include those of silver, lithium, sodium, potassium, rubidium, cesium, magnesium, calcium, barium, strontium, and aluminum. Potassium permanganate is presently preferred because of its ready availability and purity.

The supported chromium oxide catalysts can comprise a silica support which contains silica admixed with up to about 20 weight percent of one or more refractory metal oxides selected from alumina, boria, titania, thoria, and zirconia.

The supported chromium oxide catalysts are preferably silica-titania supports on which is dispersed chromium oxide or a chromium compound convertible to chromium oxide by oxidation. Such catalysts are described, for example, in U.S. Pat. No. 4,151,122, issued to McDaniel et al.

Titania of a silica support can be effected by a variety of methods. A particularly suitable support can be prepared by coprecipitation of silica and titania. In such a coprecipitation method, a titanium compound such as a titanium halide, nitrate, sulfate, oxalate, or alkyl titanate, for example, is incorporated with the acid or alkali metal silicate. Coprecipitation methods are disclosed in U.S. Pat. No. 3,887,494, the disclosure of which is hereby incorporated by reference.

A suitable silica-titania support can be formed by other methods such as by titanation of silica with titanium compounds, e.g., titanium chelates such as titanium acetylacetonate, triethanolamine titanium, lactic acid titanium chelate and tetraoctylene glycol titanium chelate, all commercially available from Dupont under tradenames Tyzor AA ®, Tyzor TE ®, Tyzor LA ®, and Tyzor OC ®, respectively. Other suitable titanium compounds include titanium alkoxides such as titanium tetraisopropoxide and titanium halides such as titanium tetrachloride and mixtures of such compounds. The silica can be aqueously impregnated with hydrolysis-resistant titanium chelates such as Tyzor TE ®, LA ®, and OC ®. Hydrolysis-sensitive compounds such as the remainder noted above can be employed neat if liquid or dissolved or dispersed in a nonaqueous solvent such as n-hexane. It is also possible to disperse the titanium compounds by contact with the fluidized silica at a moderate temperature, e.g., 100°–200° C.

The amount of titanium present in the finished catalyst will generally range from about 0.5 to about 10 weight percent, preferably about 1 to about 5 weight percent, based on the weight of the catalyst. The titanium will be present as an oxide of the titanium.

The chromium component of the catalyst comprises about 0.001 to about 10 weight percent chromium, preferably about 0.1 to about 5 weight percent, based on the weight of the calcined catalyst. Methods of incorporating chromium into a silica-containing support material are known in the art. Generally, the chromium component can be coprecipitated with the silica or the silica-titania or added by means of a nonaqueous solution of a chromium compound such as tertiary-butyl chromate to the xerogel, but it is preferably introduced by incorporating an aqueous solution of a water-soluble chromium compound into the hydrogel after washing the hydrogel to remove alkali metal ions. Suitable chromium compounds include chromium acetate, chromium nitrate, chromium sulfate, chromium trioxide, ammonium chromate or any other chromium compound which can be converted to chromium oxide by calcination, with at least part of the chromium being converted to the hexavalent state. As used herein, the term "chromium oxide," referring to the chromium compound present in the catalyst after calcining, includes fixed surface chromates formed by the reaction of chromium oxide and silica, as discussed in Hogan, J. Poly. Sci. A-1, 8, 2637-2652 (1970).

The permanganate treatment is carried out by contacting the catalyst with an aqueous or nonaqueous solution of the permanganate prior to activation of the catalyst. With large-pore catalysts such as those containing chromium oxide supported on the silica-titania cogel of U.S. Pat. No. 3,887,494, issued to Dietz, or the silica of U.S. Pat. No. 3,900,457, issued to Witt, which may suffer structural damage in the presence of water, it is necessary to employ nonaqueous solvents and particularly polar aprotic solvents such as acetonitrile to avoid such damage. With smaller-pore silicas not damaged by contact with water such as, for example, spray-dried microspheroidal catalytic grade silicas commercially available, water solutions of the permanganate can be used.

The contacting temperature employed can vary depending upon the nature of the solvent employed and the contacting method used. The temperature will generally range from about 10° to about 100° C. Usually, the contacting will be carried out by slurrying the catalyst in the desired solvent and adding to the slurry a solution of the permanganate in the same solvent. It is also possible to add the permanganate solution to a fluidized catalyst. Generally, sufficient permanganate solution is added such that a persistent purplish color remains indicating a slight excess is present. Greater or lesser amounts can be employed. In the finished dry catalyst the atomic ratio of Cr:Mn can range from about 100:1 to about 5:1, more preferably 50:1 to 20:1.

Following contacting with permanganate, the resulting mixtures are dried and the catalyst is activated. The catalyst can be activated by calcining in air at a temperature within the range of 400° C.(750° F.) to 1100° C. in a dry atmosphere containing oxygen, usually dry air, for a time of about 10 minutes to 20 hours or longer. Activation can follow titanation of the catalyst in the activator, as described above, by heating the fluidized catalyst sample to about 316° C., substituting dry air for the nitrogen atmosphere present during titanation, raising the temperature to at least about 400° C., and calcining the fluidized catalyst at this elevated temperature for the chosen activation time. To obtain the maximum advantage, a presently preferred method of activation is the reduction-reoxidation process described in U.S. Pat. No. 4,151,122, the disclosure of which is incorporated herein by reference, wherein the catalyst is sequentially heated in a reducing ambient such a CO and in an oxidizing ambient such as air. Such activation is believed to give the maximum melt index capability to the catalyst for producing high melt index polymer, e.g., polymer having a melt index of 2 or more, along with decreased shear response capability.

In the reduction/reoxidation process preferably employed to make polyethylene having a melt index, for example, between about 4 and 8, a cogel catalyst which has been treated with potassium permanganate is heated in a reducing atmosphere such as carbon monoxide or a mixture of carbon monoxide and nitrogen for a time of from 1 to 24 hours, preferably about 3 hours to about 6 hours. The temperature of the reduction process can range from about 600° C.(1110° F.) to about 1100° C.(2000° F.) but is preferably in the range of about 760° C. to 925° C. The catalyst is then oxidized at an elevated temperature ranging from about 450° C.(840° F.) to about 1000° C. (1832° F.), preferably slightly lower than the reduction temperature, e.g., about 650° C. to about 870° C. for a time ranging from 0.5 to 24 hours, preferably about 2 to about 6 hours.

Although the invention catalyst can be employed in various polymerization processes such as gas phase, solution form and particle form, it is presently preferred to employ the catalyst in a particle-form process, in which the melt index-shear response benefits are most desirable. The catalyst is suitable for the production of normally solid ethylene homopolymer and copolymer. Ethylene can be copolymerized with one or more aliphatic mono-1-olefins containing from 3 to about 10 carbon atoms and/or a conjugated diolefin containing from 4 to about 12 carbon atoms. In such polymers the ethylene content generally ranges from about 90 to about 99.9 mole percent. The polymers can be fabricated by conventional plastics processes such as extrusion, blow molding and injection molding into various useful articles such as film, bottles, fibers and pipe.

It is preferred to conduct the polymerization under particle-form conditions to obtain the polymer in the form of discrete, solid particles suspended in the reaction medium. This can be accomplished by conducting the polymerization in the presence of a dry inert hydrocarbon such as isobutane, n-heptane, methylcyclohexane or benzene at a reactor temperature within the range of about 60° C. to about 110° C. and a reactor pressure of about 1.7 to about 4.1 MPa(250 to 600 psia). The polymer can be recovered, treated with $CO_2$ or $H_2O$, for example, to deactivate residual catalyst, stabilized with an antioxidant such as butylated hydroxy toluene (BHT), and dried by conventional methods to obtain the final product. Hydrogen can be used in the reactor as known in the art to provide some control of the molecular weight of the polymer.

EXAMPLE I

Catalyst Preparation

Each catalyst was derived from treating individual portions of a commercial catalyst (stock catalyst) from Davison Chemicals produced by admixing sulfuric acid containing titanyl sulfate with sodium silicate to produce a Si/Ti gel, impregnating the gel with aqueous $CrO_3$, azeotrope drying with ethyl acetate, and calcining in air to a final temperature between 427° and 482° C. Analysis showed this catalyst to contain 0.84 weight percent chromium and 1.96 weight percent titanium, the balance being silica and oxygen combined with the metals.

Each catalyst portion was individually activated in a 43 mm (outer diameter) quartz tube surrounded by an electric furnace under fluidized bed conditions with 42 standard liters per hour of the designated gas. The temperature was raised at a rate of 3.9° C. (7° F.) per minute in the activations, starting at about 25° L C. (77° F.). Each sample consisted of about 30 mL (10 g) of catalyst.

The invention catalyst was prepared by slurring 22.2 g of stock catalyst in about 500 mL of acetonitrile. To the stirred slurry was added a saturated solution of $KMnO_4$ in acetonitrile (about 1 weight percent $KMnO_4$) until a faint persistent purplish color was evident. The color was removed from the catalyst by gently heating in a stream of dry nitrogen. The recovered powdery product was stored under dry nitrogen for subsequent activation. At that time, it was divided into about 3 equal portions, each portion being activated under slightly different conditions. Analysis of the product was carried out and it was determined that the atomic ratio of Cr:Mn was about 23:1.

Invention Catalyst 1

One portion of the $KMnO_4$-treated catalyst was heated under fluidizing conditions in dry nitrogen to 1600° F. (871° C.). The gas was changed to 5 volume percent CO in 95 volume percent $N_2$ and heating was continued for 4 hours at 1600° F. (871° C.). Then, in nitrogen alone, the temperature was lowered to 1200° F. (649° C.), dry air was substituted for nitrogen and heating was continued at 1200° F. (649° C.) for 2 hours. At that time, heating was discontinued, the tube was removed from the furnace while gas was passed through it, and the contents were cooled to about room temperature. The sample was removed and stored in dry air until used for ethylene polymerization.

Invention Catalyst 2

A second portion of the permanganate-treated catalyst was activated as for catalyst 1 except that the catalyst after the 5/95 $CO/N_2$ treatment at 1600° F. was cooled to 1300° F. (704° C.) in nitrogen and the heating continued for 2 hours at 1300° F. in dry air. The catalyst was recovered as before.

Invention Catalyst 3

A third portion of the permanganate-treated catalyst was activated as for catalyst 1 except that the catalyst after the 5/95 $CO/N_2$ treatment at 1600° F. was cooled to 1400° F. (760° C.) in nitrogen and the heating was continued for 2 hours at 1400° F. in dry air. The catalyst was recovered as before.

Control Catalyst 4

A portion of the untreated stock catalyst was activated and recovered exactly as described for catalyst 1.

Control Catalyst 5

Another portion of the untreated stock catalyst was activated and recovered exactly as described for catalyst 2.

Control Catalyst 6

Another portion of the untreated stock catalyst was activated and recovered exactly as described for catalyst 3.

Comparison Control Catalyst 7

A portion of the untreated stock catalyst was activated by heating it in dry air under fluidizing conditions to 900° F.(482° C.). The air was then substituted with dry nitrogen, and heating was continued to 1000° F. (538° C.). The nitrogen was changed to 5/95 $CO/N_2$, heating was continued to 1600° F., and the temperature was held at 1600° for 4 hours in the gas mixture. The sample was then cooled to 1200° F. in nitrogen and the activation was continued at 1200° F. in dry air for 2 hours. The activated sample was recovered and stored as before.

Comparison Control Catalyst 8

Another portion of the untreated stock catalyst was activated as described for catalyst 7 except that the catalyst after the 5/95 $CO/N_2$ treatment at 1600° F. was cooled to 1300° F. in nitrogen and the heating was continued for 2 hours at 1300° F. in dry air. The activated sample was recovered and stored as before.

Comparison Control Catalyst 9

Another portion of the untreated stock catalyst was activated as described for catalyst 7 except that the catalyst after the 5/95 $CO/N_2$ treatment at 1600° F. was cooled to 1400° F. in nitrogen and the heating was continued for 2 hours at 1400° F. in dry air. The activated sample was recovered and stored as before.

Comparison Control Catalyst 10

A portion of the untreated stock catalyst was activated in a sequence of steps by heating it in dry nitrogen under fluidizing conditions to 800° F. (427° C.), continuing heating to 1600° F. under 5/95 $CO/N_2$ gas, and holding the temperature for 4 hours at 1600° F. in the gas mixture. The sample was then cooled to 1200° F. in nitrogen and the activation was continued at 1200° F. for 2 hours in dry air. The activated sample was recovered and stored as before.

Comparison Control Catalyst 11

Another portion of the untreated stock catalyst was activated as described for catalyst 10 except that the catalyst after the 5/95 $CO/N_2$ treatment at 1600° F. was cooled to 1300° F. in nitrogen and the heating continued for 2 hours at 1300° F. in dry air. The activated sample was recovered and stored as before.

EXAMPLE II

Polymerization

Ethylene polymerization was carried out with individual portions of each activated catalyst under particle form conditions in an isobutane diluent at 225° F. (107° C.) by contact with ethylene in a 2 L stirred, stainless steel reactor for a time estimated to achieve a productivity of about 5,000 g polymer per gram of catalyst. The total nominal reactor pressure in each run was 565 psia (3.90 MPa). Ethylene was supplied as needed in the reaction to maintain the reactor pressure constant from a pressurized reservoir. Each run was terminated by discontinuing ethylene flow, shutting off the heat, and venting gaseous products. The recovered product was dried overnight in a vacuum oven and weighed, and the melt index (MI) and high load melt index (HLMI) values in terms of g/10 minutes were determined in accordance with ASTM 1238-65T, conditions E and F, respectively. All MI and HLMI values are corrected to a common 5,000 g polymer per gram catalyst basis as is practiced in the art to interpret the results. Catalyst sample weights and the results obtained are given in Table 1. A plot of HLMI/MI vs MI is given in FIG. 1.

TABLE 1

| | Catalyst | | | | | Ethylene Polymerization | | Polymer | | | | Calc. |
|---|---|---|---|---|---|---|---|---|---|---|---|---|
| Run No. | Air Reox Temp. °F. | Wt. g | Run Time, Min. | | | Polymer Yield g | Prod. g/g | HLMI | | | Remarks | Prod.* g/g/hr |
| | | | Induc. | Polym | Total | | | MI | HLMI | MI/MI | | |
| 1 | 1200 | 0.0625 | 8 | 115 | 123 | 302 | 4830 | 3.7 | | 45 | In. | 2520 |
| 2 | 1300 | 0.0424 | 10 | 44 | 54 | 214.5 | 5060 | 8.8 | | 37 | In. | 6900 |
| 3 | 1400 | 0.0487 | 10 | 50 | 60 | 201.5 | 4140 | 4.3 | | 41 | In. | 4970 |
| 4 | 1200 | 0.0427 | 9 | 95 | 104 | 204 | 4780 | 4.6 | | 46 | Cn. | 3020 |
| 5 | 1300 | 0.0414 | 7 | 75 | 82 | 206 | 4980 | 7.8 | | 41 | Cn. | 3980 |
| 6 | 1400 | 0.0436 | 15 | 69 | 84 | 238 | 5460 | 9.9 | | 43 | Cn. | 4750 |

TABLE 1-continued

| Catalyst | | | Ethylene Polymerization | | | | | Polymer | | | Calc. |
| | | | Run Time, Min. | | | Polymer Yield | Prod. | HLMI | | | Prod.* |
| Run No. | Air Reox Temp. °F. | Wt. g | Induc. | Polym | Total | g | g/g | MI | MI | Remarks | g/g/hr |
|---|---|---|---|---|---|---|---|---|---|---|---|
| 7 | 1200 | 0.0624 | 4 | 70 | 74 | 274 | 4390 | 6.1 | 43 | Cn.Cm. | 3760 |
| 8 | 1300 | 0.0635 | 10 | 85 | 95 | 308 | 4850 | 4.9 | 50 | Cn.Cm. | 3060 |
| 9 | 1400 | 0.0560 | 7 | 95 | 102 | 248 | 4390 | 5.5 | 46 | Cn.Cm. | 2580 |
| 10 | 1200 | 0.0341 | 14 | 80 | 94 | 173 | 5070 | 5.6 | 50 | Cn.Cm. | 3240 |
| 11 | 1300 | 0.0230 | 24 | 55 | 79 | 108 | 4700 | 8.4 | 44 | Cn.Cm. | 3570 |
| 12 | 1400 | 0.0348 | 12 | 65 | 77 | 165 | 4740 | 8.4 | 40 | Cn.Cm. | 3690 |

*Calculated from the productivity values and polymerization times assuming linearity over the time span.
In. = Invention
Cn. = Control
Cm. = Comparison Table 1 shows the melt index and HLMI/MI ratio for polymers prepared using the invention catalyst and various control catalysts over a polymer melt index range of about 4 to about 9. Thus, comparing invention runs 1–3 with strict control runs 4–6, it can be seen that for approximately equal MI values the HLMI/MI values for the invention runs are smaller than those of the control runs. Similar results are evident for the invention runs versus the comparison control catalysts of runs 7–12. They are called comparison controls because the initial stage of the activation sequence differs from that of runs 1–6.

The effect of catalyst permanganate treatment on the polymer shear response is shown in the FIGURE, in which shear response, expressed in terms of HLMI/MI, is plotted as a function of melt index. It is shown that the shear response of particle form polyethylene produced from cogel catalyst activated by sequential reduction/reoxidation is lowered, for a given melt index, if the catalyst is impregnated with potassium permanganate prior to activation.

Inspection of the data also reveals that the invention catalyst appears to be more active, except for that of run 1, than the control catalysts, based on total run times and the same air reoxidation temperatures during the activation sequence.

I claim:

1. A method for preparing a polymerization catalyst comprising the steps of
   (a) contacting a material comprising silica-supported chromium oxide or a compound oxidizable to chromium oxide with a solution of a permanganate compound;
   (b) heating the thus-contacted material in a reducing atmosphere at a temperature in the range of about 600° C. to about 1100° C.; and then
   (c) heating the material in an oxygen-containing atmosphere at a temperature in the range of about 450° C. to about 1000° C. for at least about one-half hour.

2. The method of claim 1 in which the permanganate is potassium permanganate.

3. The method of claim 2 in which the catalyst contains chromium in an amount of about 0.001 to about 10 weight percent based on the weight of the catalyst.

4. The method of claim 3 in which the catalyst contains titanium in an amount within the range of about 0.5 to about 10 weight percent based on the weight of the catalyst.

5. The method of claim 4 in which the temperature of step (b) is in the range of about 760° C. to about 925° C.

6. The method of claim 5 in which the temperature of step (c) is in the range of about 650° C. to about 870° C.

7. The method of claim 6 in which the potassium permanganate is employed in the form of a solution of potassium permanganate in acetonitrile.

8. The method of claim 6 in which the chromium is present in an amount of from about 0.1 to 5 weight percent.

9. The method of claim 8 in which the reducing atmosphere comprises carbon monoxide.

10. The method of claim 9 in which the reducing atmosphere comprises a mixture of carbon monoxide and nitrogen.

11. The method of claim 9 in which step (c) is carried out in an atmosphere comprising air.

12. The method of claim 11 in which the contacted material is chromium oxide supported on a silica-titania cogel which has been calcined in air.

13. The method of claim 12 in which steps (b) and (c) are carried out under fluidized bed conditions.

14. The method of claim 1 in which the contacted material is prepared by admixing sodium silicate and sulfuric acid containing titanyl sulfate to form a gel, impregnating the gel with aqueous chromium oxide, azeotrope drying the gel, and calcining the gel in air.

15. A polymerization catalyst prepared by the process of claim 1, 2, 3, 4, or 12.

16. The method of claim 1 in which the chromium oxide or compound oxidizable to chromium oxide is supported on a silica-titania support and the permanganate compound is in a non-aqueous solution.

17. The method of claim 16 in which steps (b) and (c) take place under fluidized bed conditions.

18. The method of claim 17 in which the reducing atmosphere comprises carbon monoxide.

* * * * *